INVENTOR.
ROGER WYLIE,
RALPH JAMES, JR.,
BY
ATTORNEY.

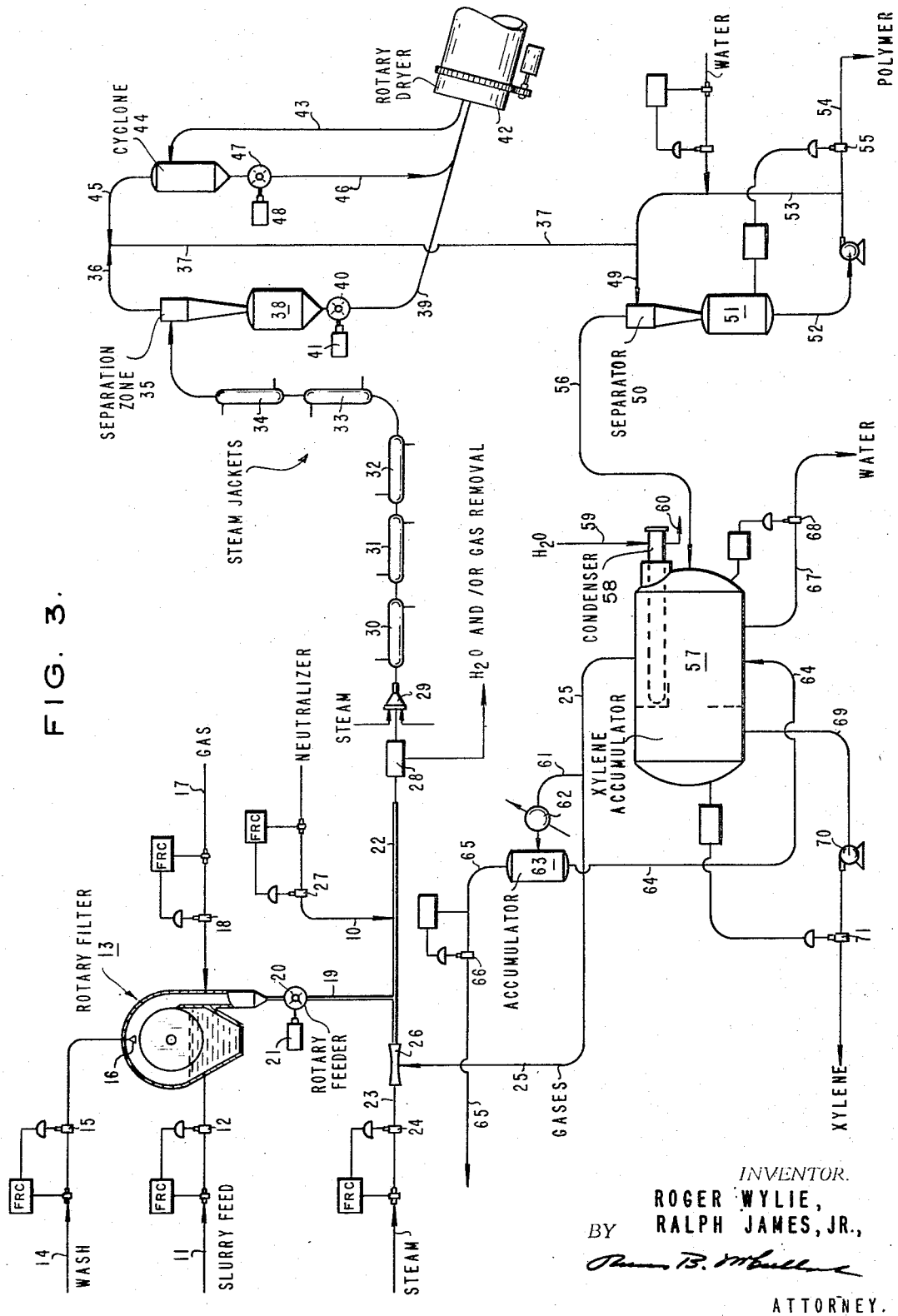

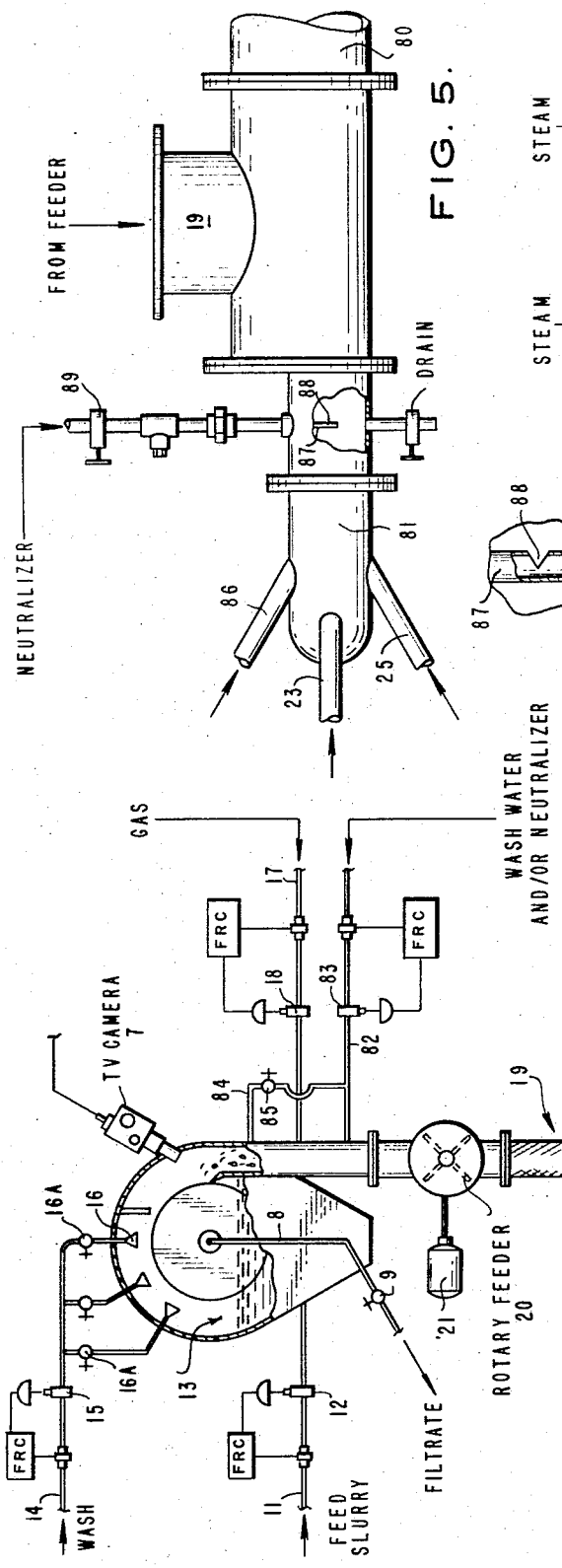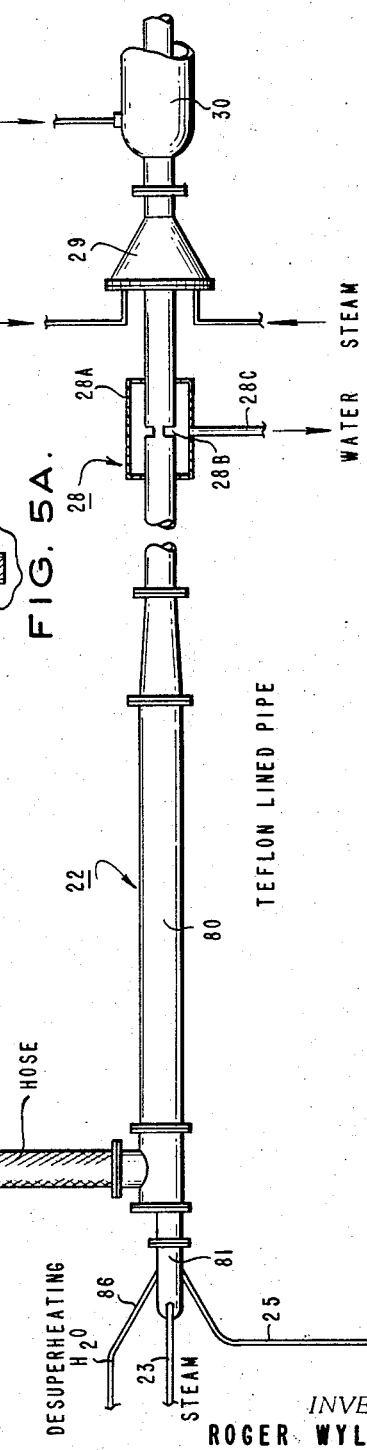

United States Patent Office 3,365,808
Patented Jan. 30, 1968

3,365,808
METHOD AND APPARATUS FOR DRYING OF POLYOLEFINS IN AN ELONGATED TRANSFER ZONE
Ralph James, Jr., Channelview, and Roger Wylie, Baytown, Tex., assignors to Esso Research and Engineering Company
Filed May 9, 1966, Ser. No. 548,626
12 Claims. (Cl. 34—9)

The present invention is directed to drying of solid particulate material. More particularly, the invention is concerned with drying of hydrocarbon-wet polyolefins. In its more specific aspects, the invention is concerned with drying of hydrocarbon-wet polyolefins under conditions where the polymer quality is not degraded or deteriorated.

The present invention may be briefly described as a method of drying a solid particulate material such as a hydrocarbon-wet solid polymer of an alpha monoolefin in which the wet solid polymer is admixed and contacted with water vapor at a temperature of at least 150° F. in an elongated transfer zone to form a suspension of the polymer in the water vapor. The polymer and the water vapor are maintained in contact for a sufficient length of time while flowing the suspension through the zone to remove substantially the hydrocarbon from the polymer. The dried polymer is then recovered from the suspension. The water vapor is employed in an amount no greater than about 4 pounds per pound of hydrocarbon removed from the polymer and the suspension is flowed through the elongated transfer zone at a velocity of about 50 to about 160 feet per second. Usually about 1 to about 2 pounds of water vapor per pound of hydrocarbon removed may be used. The wet polymer contains from about 3% to about 60% by weight of hydrocarbon. The temperature within the elongated transfer zone is suitably within the range from about 200° F. to about 280° F. Temperatures suitably within the range from about 200° F. to about 230° F. may be employed.

While the invention will be described with respect to a xylene-wet polymer, the polymers should not be limited to xylene-wet polymers since other hydrocarbon-wet polymers, such as those wet with paraxylene or paraffinic hydrocarbons, may be employed. For example, polymers wet with aromatic hydrocarbons such as benzene, toluene and xylene and the other alkyl-substituted aromatic hydrocarbons or a paraffinic hydrocarbon such as pentane, hexane, octaine, isomers thereof and the like may be used in lieu of an aromatic hydrocarbon.

While the suspension is flowed through the elongated transfer zone at a velocity from about 100 to about 160 feet per second, in the initial position of the zone, say about 5 to about 15% of said elongated zone, the suspension will be flowed at a velocity of 40 to 80 feet per second, the purpose being to flow it at a low velocity until a substantial amount of the hydrocarbon is removed to prevent agglomoration and sticking of the polymer to the wall of said elongated zone. This also allows the particle size to be controlled. Otherwise, the particle size of the polymers would be such that large chunks rather than fine powder would be produced. If the velocity is not controlled properly in the transfer line zone, either large chunks of particles are produced or an excessive amount of fines are obtained. In other words, in accordance with the present invention, control of velocity is important in the first contact zone.

It is contemplated in accordance with the present invention that liquid water may be admixed with the polymer when the suspension is formed. In accordance with the present invention, it is also contemplated that liquid water may be removed in an intermediate portion of the elongated zone at one or more intermediate points as may be desirable. Likewise, it is contemplated that additional water vapor may be introduced into the elongated transfer line zone at one or more intermediate points in the zone. It is further contemplated that the elongated transfer line zone may be heated intermediate its ends by application of indirect heat in which the temperature of the zone may vary such that it may increase, decrease, or remain constant from the inlet to the outlet.

Since the polymer as it is being transferred from the zone and dried initially may be in a quite sticky condition, the inner wall or surface of the initial portion of the zone, say about the first 5% to about 10% of the zone may be formed by a nonadherent surface comprising what is commercially known to the trade as Teflon. There are many fluorinated polymers that are sold under the trade name of Teflon and it is desirous that a nonadherent Teflon be used in the practice of the present invention.

The polymers which are employed in the practice of the present invention which are dried may be any solid polymer of an alpha monoolefin which is wet with a hydrocarbon diluent, suitably the hydrocarbon diluent used in the manufacture of the solid polymer. Solid polymers of alpha monoolefins, such as ethylene, propylene, butene, pentylene and the higher members of the same homologous series may be dried in accordance with the present invention. Likewise, copolymers of alpha monoolefins, such as copolymers of ethylene and propylene, may be dried in accordance with the present invention. Likewise, terpolymers, such as ethylene, propylene and norbornylene, may be dried in accordance with the present invention. Other terpolymers, such as ethylene, propylene and butadiene, may also be dried. It is contemplated in the practice of the present invention that the invention is broadly applicable to drying wet solid polymers of one or more alpha monoolefins together with a third unsaturated component.

The polymers employed in the practice of the present invention are suitably formed by using the Ziegler catalyst which, for example, may be a $TiCl_3 \cdot \frac{1}{3} AlCl_3$ catalyst promoted with diethyl $AlCl_3$ or triethyl aluminum and the like. Other catalysts besides the Ziegler catalyst which are well known may be used in forming the polymer which is dried in accordance with the present invention. The invention will be further illustrated by reference to the drawing in which:

FIGURE 3 is a schematic flow diagram illustrating a preferred mode and embodiment;

FIGURE 4 is an enlarged partial view of a portion of FIGURE 3;

FIGURES 5 and 5A are enlarged partial sectional views of another portion of FIGURE 3;

Figure 1:
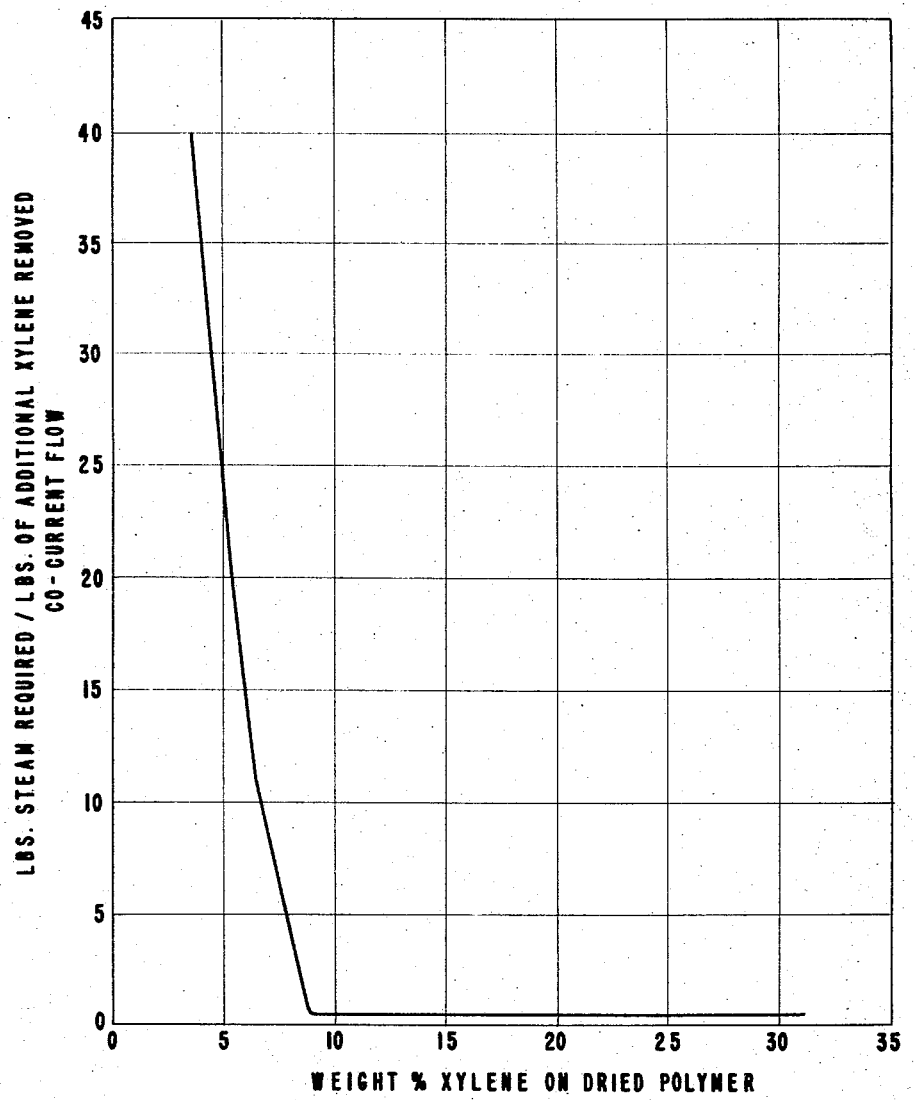
FIGURE 1 is a plot of data showing the relationship between the amount of xylene remaining on the dried polymer and the amount of additional steam required to remove an incremental pound of xylene in a drying operation in accordance with the present invention.

Referring now to the drawing, and particularly to

FIGURES 3-5, in which identical numerals designate identical parts, numeral 11 designates a flow line through which a slurry of polypropylene, for example in xylene, is introduced from a polymerization reaction system (not shown) through a control valve 12 which suitably may be a flow rate controller into a rotary filtration zone 13. Also introduced into rotary filtration zone 13 through line 14 is a solvent wash which suitably may be a mixture of 0-100% xylene and 0-100% methanol but which will usually be 70-100% xylene. Similar to line 11, line 14 may be controlled by valve 15 operated by a flow rate controller. The solvent wash may be introduced into filtration zone 13 through a distribution means generally indicated by the numeral 16.

Also introduced into zone 13 is noncondensing gas by way of line 17 controlled by valve 18 which also may be on a flow rate controller.

The wet filter cake from zone 13 containing from about 3% to about 60% by weight of hydrocarbons is discharged from zone 13 by line 19 containing a rotary feeder 20 operated by motor 21. The rotary feeder 20 serves to discharge the wet polymer in line 19 into an elongated transfer line 22 into which is introduced by line 23 wet steam from a source (not shown) by control of valve 24 which also may be on a flow rate controller.

Also introduced into zone 22 by line 25 from a source which will be described further are gases recovered in the process. Line 25 may suitably terminate in a suitable jet compressor 26 which serves to pull the gases into line 22 along with the steam from line 23. Also introduced into line 22 is a neutralizer by way of line 10 controlled by valve 27 on a flow rate controller. This neutralizer is suitably a solution of sodium hydroxide, sodium methylate, barium hydroxide and other suitable neutralizing agents which would not impair the color of the solid polymer.

The solid polymer introduced into transfer line 22 is formed into a suspension with the steam and gas introduced by lines 24 and 25, respectively, as the suspension flows through the transfer line 22 and the hydrocarbon is progressively removed from the suspension as it travels through the line.

It is contemplated that liquid water which may contain some gas may be removed from the suspension in transfer line 22 by water removal means 28 which will be described further hereinafter. Likewise, it is contemplated that secondary steam may be introduced into line 22 by secondary steam injection means 29 which also will be described further hereinafter. Similarly, it is contemplated that additional heat may be supplied to the suspension in transfer line 22 and this may be provided by suitable heat transfer means 30, 31, 32, 33 and 34 provided with steam inlet and outlet means which provide indirect heat exchange with the suspension and results in a gradual increase in temperature from the inlet of line 22 to its outlet. The temperature at the inlet may be about 212° F. while at the outlet it may be as much as 280° F. However, it is preferred to maintain a temperature ranging from 212° F. to 240° F. since, in the upper portion of the temperature range, if the velocity is low there is danger of color degradation by degradation of the polymer. However, in accordance with the present invention, so long as high velocities are employed, even at temperatures of 280° F. color degradation is not suffered. Temperatures in excess of 280° F. should not be employed because at temperatures above about 280° F. fouling of the surface of the transfer line may occur.

The substantially dry suspension in zone 22 then discharges at its terminus into a separation zone 35 which suitably may be a cyclone separator. The gases or vapors from zone 35 discharge by line 36 into line 37 for further treatment as will be described further while the solid dried polymer discharges into a bin 38 for discharge into a line 39 by feed means 40 operated by motor 41. Line 39 discharges the dried polymer into a second stage rotary dryer 42 for removal of any residual hydrocarbon which may remain on the dried polymer. The dried polymer discharged by line 39 may contain from about 2% to about 10% by weight of liquid hydrocarbon. Gases and vaporous polymer discharge from rotary dryer 42 by line 43 into a second separator, such as cyclone 44 with the gases and vapors from cyclone 44 being introduced by line 45 into line 37. The solid polymer is recovered in cyclone separator 44 discharged by line 46 into line 39 through feed means 47 controlled by motor 48.

The vaporous and gaseous material in line 37 discharges into line 49 and thence into a third separator, such as cylone separator 50, from which additional fine polymer is recovered in bin 51 for discharge by line 52. The material may be recycled to cyclone separator 50 by line 53 or withdrawn from the system by line 54 controlled by valve 55.

The vaporous and gaseous material from cyclone separator 50 discharges by line 56 into a condenser-accumulator for recovery of the liquid hydrocarbon, such as xylene condenser-accumulator 57 which is provided with a condensing means, such as a suitable heat exchanger 58 which may be of the tubular type, into which water is introduced by line 59 and withdrawn by line 60. The vapors from condenser-accumulator 57 are withdrawn by line 25 and recycled as has been described. It may be desirable, however, to withdraw these vapors by branch line 61 through an accumulator 62 and into an accumulator 63 for recycling of this material by line 64 to condenser-accumulator 57 with gases being discharged by line 65 controlled by valve 66. Water may be discharged from condenser-accumulator 57 by line 67 controlled by valve 68 while xylene is recovered from condenser-accumulator 57 by line 69, pump 70 and valve 71.

Referring now to FIGURE 4, the rotary filtration zone 13 and the inlet to transfer line zone 22 are shown in more detail. In FIGURE 4, the distribution means 16 may suitably comprise a manifold suitably controlled by valves 16A which allow the alcohol-hydrocarbon to be deposited over a large portion of the surface of the filter cake. Likewise, in FIGURE 3, discharge of filtrate was not shown and to this end line 8 is provided controlled by valve 9 for discharge of filtrate from the rotary filtration zone 13.

A TV camera 7 is provided which is mounted such that the operator may remotely observe operations in the rotary filtration zone 13 to monitor these operations to control the quality of the filter cake.

In FIGURE 3, line 19 is illustrated schematically. Actually, line 19 is a Teflon-lined metal braided hose which is used to prevent the filter cake from sticking to the walls of line 19. This also provides for thermal expansion. The Teflon-lined hose may suitably be connected to the rotary feeder 20 by suitable flange means.

The initial portion of transfer line 22, generally indicated by numeral 80, is of slightly larger diameter than the other portion. This portion 80 may comprise about 5% to about 10% of the length of transfer line zone 22. This zone is also lined with Teflon or other material to prevent sticking of the wet filter cake to the internal wall of the zone. This initial portion 80 of zone 22 is of larger diameter than the other portion of zone 22 and, for example, may be comprised of 8" diameter conduit, while the other portion of zone 22 may be comprised of 6" diameter conduit in which the velocity in the initial portion may be substantially less than the velocity in the second portion of the zone 22. Velocities in the initial portion may range from about 40 to about 80 feet per second, whereas the remaining portion may range from about 100 to about 160 feet per second.

The initial portion 80 of zone 22 is provided with an injection means generally indicated by numeral 81 and shown in more detail in FIGURE 5.

It is to be noted in FIGURE 4 that an auxiliary line 82 is provided for introduction of wash water and/or neutralizer into the discharge from the filtration zone 13. Line 82 is controlled by valve 83 and is provided with a branch line 84 controlled by valve 85 which allows water and/or neutralizer to be injected upstream as indicated.

Referring now to FIGURES 5 and 5A, it will be noted that the injection means 81 is provided with a line 86 for introducing water to remove super heat, line 23 for introduction of steam, and line 25 for introduction of gas as has been described with respect to FIGURE 3 and also with respect to FIGURE 4. A neutralizing agent may be introduced into injection means 81 through an injection device comprising an inlet pipe 87 which may be closed on its lower end and provided with an inlet notch 88. Line 87 may be controlled by a valve 89 and connects to a source of neutralizing agent.

Referring back to FIGURE 4, it will be seen that the free water removing means 28 comprises a jacket 28A and a plurality of ports 28B. In line 22, the jacket 28A is provided with a discharge means such as outlet 28C for removal of water. Outlet 28C may be suitably controlled by a valve (not shown).

Figure 6:
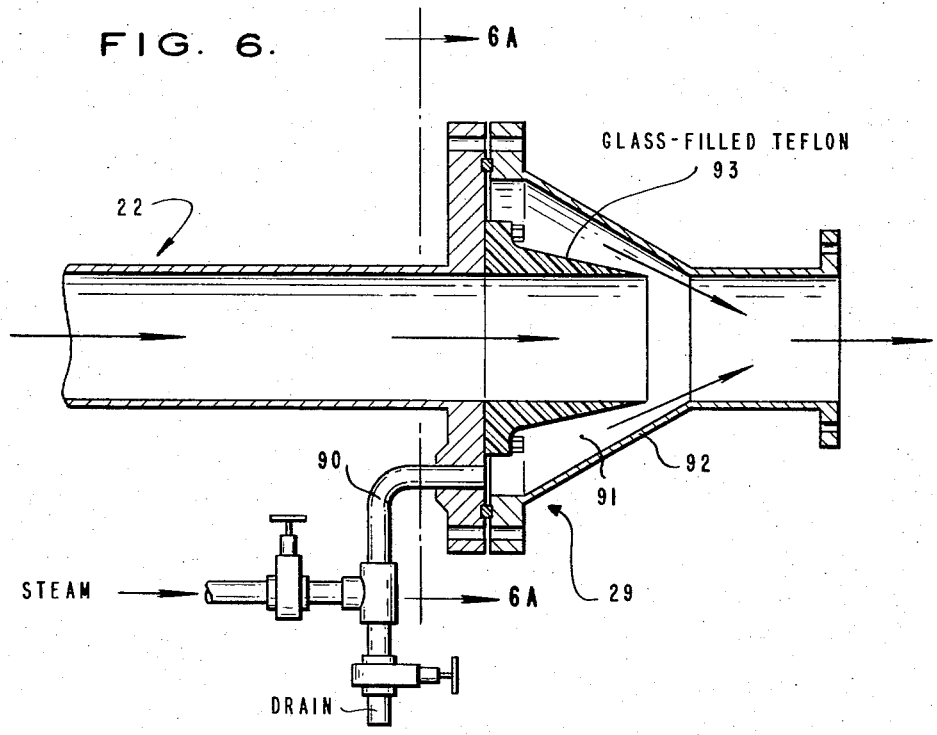
FIGURES 6 and 6A are partial sectional views of another portion of FIGURE 3.
Figure 6A:
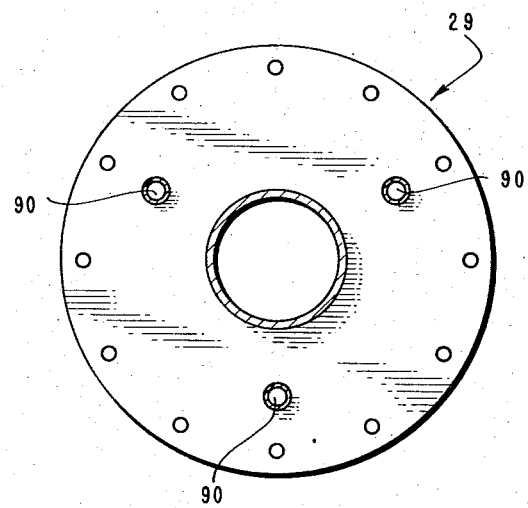

Referring now to FIGURES 6 and 6A, the secondary steam injection means 29 will be described in more detail. The secondary steam injection means 29 is comprised of a 6″ diameter nickel pipe to which is connected 3½″ steam nozzle 90. Conical annular space 91 surrounds the 6″ pipe. The conical annular space 91 is defined or formed by a conical member 92 which is attached to the 6″ nickel pipe as shown.

A glass-filled reinforced Teflon section 93 is provided adjacent the steam inlet nozzles 90. This glass-filled Teflon section is reinforced with nickel metal if necessary and provides a heat barrier to prevent sticking of polymer to the heated surface.

It is to be noted that the water removal means 28, secondary steam injection means 29 and heating means 30, 31, 32, 33 and 34 are all arranged in the high velocity portion of the transfer line zone 22. It is desirable that there be separate heat transfer means in order to provide a temperature gradient throughout transfer line zone 22. Heated steam under pressure may be injected thereto. It is also desirable that the liquid water removal means be ahead of the heat transfer means since, otherwise, the liquid water will be vaporized thereby redepositing the ash residues which are desired to be removed.

Figure 2:
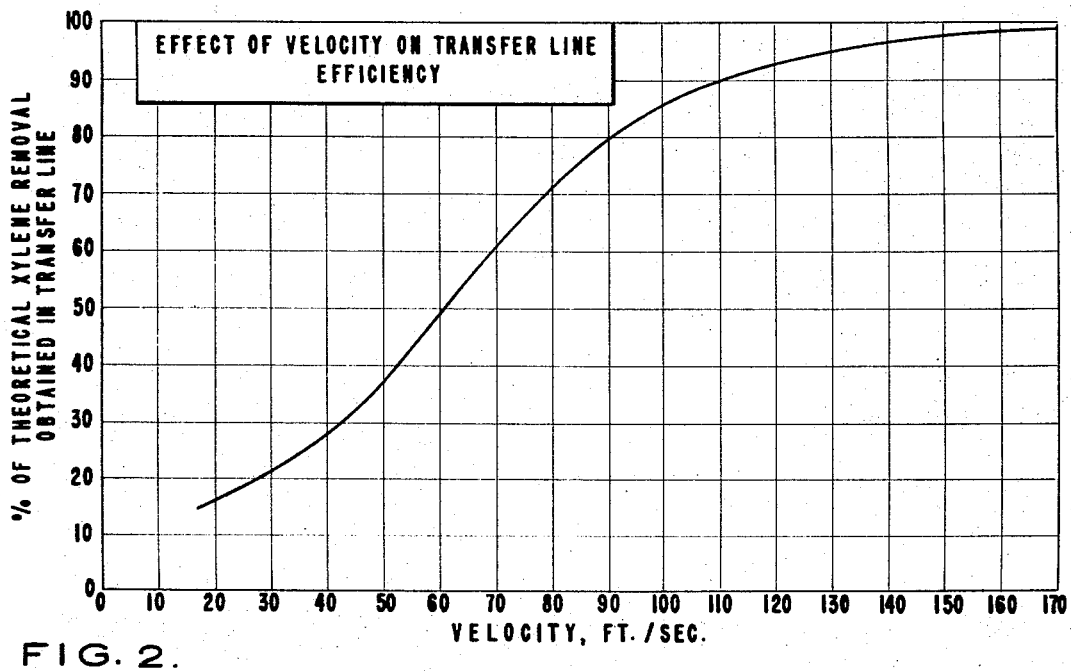
FIGURE 2 is a plot of data showing the relationship between velocity and xylene removed in the present invention.
Figure 7:
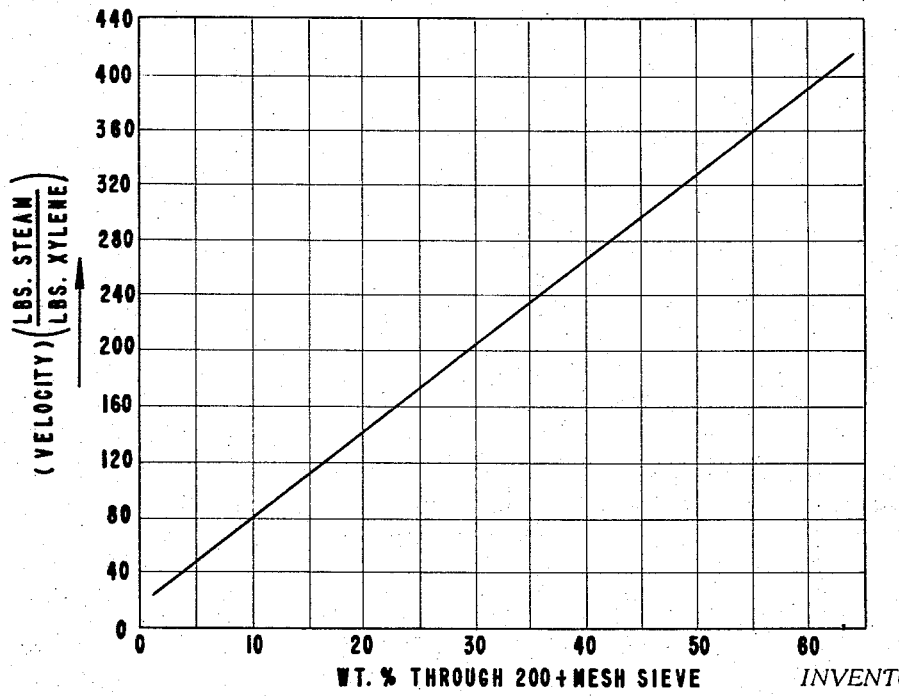
FIGURE 7 is a plot showing the relationship between velocity (pounds steam: pounds xylene) in the transfer line zone and the particle size of the polymer through 200+ mesh sieve.

Referring now to FIGURE 1 which is a plot of data showing that amounts of steam added above the amount required to decrease the xylene content of the polymer below 5–8 wt. percent are relatively ineffective, the plot shows that the steam distillation is highly effective down to a point where the xylene content is approximately 5% of the polymer weight. These data show that the present invention is a useful and advantageous method of removing hydrocarbons from solid polymer. This is also borne out by FIGURE 2 which shows the criticality of velocity in removing xylenes in a transfer line. In accordance with the present invention, at velocities below about 100 ft. per second, only about 85% of theoretical xylene removal is obtained unless mixing devices are used. Thus, equilibrium efficiencies are greatly enhanced at velocities above about 100 ft. per second. Above 160 ft. per second, there is little or no advantage in xylene removal. Velocity also affects particle size of the polymer as shown in FIGURE 7.

While the invention has been described and illustrated by reference to removal of xylene from polypropylene, it is to be understood that these examples are given by way of illustration and not by way of limitation in that the present invention is applicable to copolymers and polyethylene as well as applicable to other solvents other than xylene. For example, pentane, hexane, octane and the like may be removed from polymers of an alpha monoolefin and the like. However, optimum temperatures and steam rates for each solvent would be different from each other and from those shown for xylene.

The present invention is quite desirable and useful and has many advantages over the prior art. Among these advantages is that polymer is rapidly and efficiently removed without degradation of products and without sticking of the polymer to the walls of the equipment.

The nature and objects of the present invention having been completely described and illustrated and the best mode and embodiment contemplated set forth, what we wish to claim as new and useful and secure by Letters Patent is:

1. A method of drying a hydrocarbon wet solid polymer of an alpha monoolefin which comprises:

admixing and contacting said wet solid polymer with water vapor at a temperature of at least 150° F. in an elongated transfer zone to form a suspension of said polymer in said water vapor;

maintaining said polymer and water vapor in contact while flowing said suspension through said zone at a velocity sufficient to remove substantially said hydrocarbon from said polymer; and recovering dried polymer from said suspension;

said water vapor being employed in an amount no greater than about 4 pounds per pound of hydrocarbon removed from said polymer and said suspension being flowed at a velocity from about 100 to about 160 feet per second;

said polymer being wet with from about 3% to about 60% by weight of hydrocarbon.

2. A method in accordance with claim 1 in which the temperature is within the range from about 200° F. to about 280° F.

3. A method in accordance with claim 1 in which the hydrocarbon is xylene.

4. A method in accordance with claim 1 in which the suspension is first flowed at a velocity of about 40 to about 80 feet per second through an initial, about 5% to about 15%, portion of said zone.

5. A method in accordance with claim 1 in which liquid water is removed from said suspension at an intermediate portion of said zone.

6. A method in accordance with claim 1 in which liquid water is admixed with said polymer when said suspension is formed.

7. A method in accordance with claim 1 in which about 5% to about 10% of said zone is formed by a nonadherent surface comprising Teflon.

8. A method in accordance with claim 1 in which additional water vapor at a temperature of at least 212° F. is introduced into said zone at least at an intermediate point.

9. A method in accordance with claim 1 in which said zone is heated intermediate its ends by application of indirect heat and in which the temperature of said zone varies from the inlet to the outlet.

10. Apparatus for drying solid particulate material which comprises:

an elongated conduit;

means for indirectly heating said conduit at least at spaced apart points along its length;

means for introducing vaporous material into said conduit at an intermediate point ahead of said heating means;

means for removing liquid material from said conduit at a point ahead of said means for introducing vaporous material; and means for introducing wet particulate material into one end of said elongated conduit and means for withdrawing substantially dry particulate material from the other end of said elongated conduit;

at least an initial portion of said elongated conduit having an inner wall formed of a material which does not adhere to said particulate material.

11. Apparatus in accordance with claim 10 in which the particulate material is a solid polymer of an alpha monoolefin wet with a liquid hydrocarbon and the initial portion of said elongated conduit has an inner wall formed of Teflon.

12. Apparatus in accordance with claim 10 in which the initial portion of said elongated conduit comprises about 5% to about 10% of its length and has a diameter greater than that of the remainder of the length of said elongated conduit.

References Cited

UNITED STATES PATENTS

| | | | |
|---|---|---|---|
| 3,190,867 | 6/1965 | Oldweiter et al. | 34—10 |
| 3,218,729 | 11/1965 | Micklich | 34—10 |

FREDERICK L. MATTESON, Jr., *Primary Examiner.*

J. J. CAMBY, *Assistant Examiner.*